March 18, 1958 J. MERCIER 2,827,075
SERVO PRESSURE REGULATOR VALVE
Original Filed Oct. 30, 1944
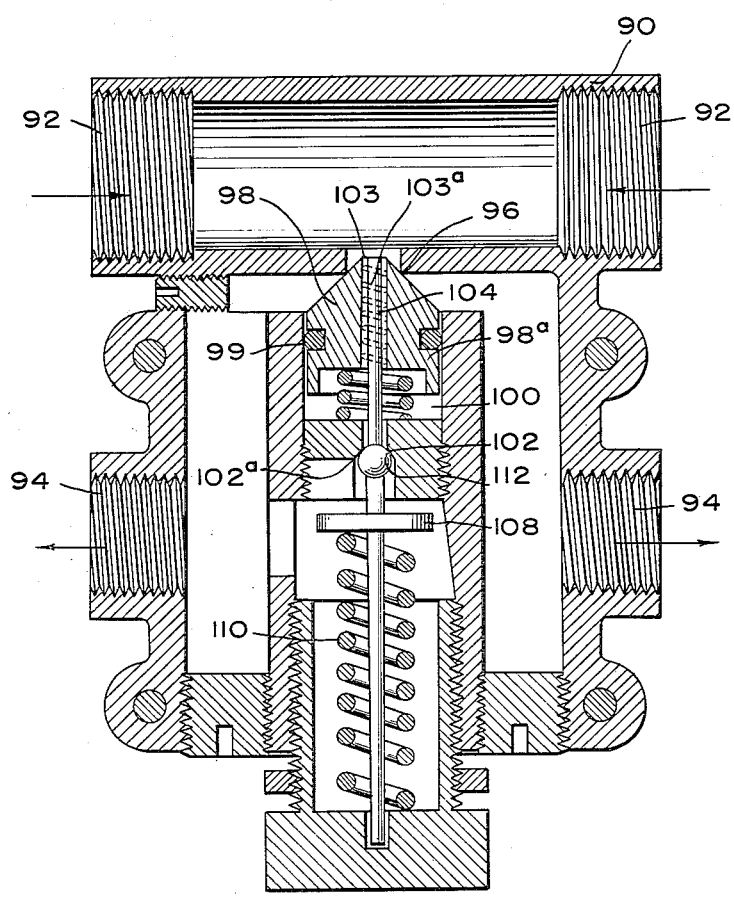
INVENTOR
JEAN MERCIER
BY Richardson, David & Nordon
ATTORNEYS 2,827,075

SERVO PRESSURE REGULATOR VALVE

Jean Mercier, New York, N. Y.

Original application October 30, 1944, Serial No. 560,998. Divided and this application September 20, 1951, Serial No. 247,406

4 Claims. (Cl. 137—491)

My invention relates to unloader valves for servo-pressure regulators, and more particularly to servo-pressure regulators and pressure relief valves in which the position of the main valve is controlled by the pressure prevailing inside a pilot pressure room controlled by a pilot valve.

This application is a division of my copending application, Serial #560,998 filed October 30, 1944 now Patent No. 2,571,154.

One object of the invention is to provide servo-pressure regulators of high sensitiveness, which open and close exactly at the desired predetermined pressure.

A particular object of the invention is to produce unloader valves which open and close with great precision under elimination of all mechanical friction.

Another object of the invention is to produce unloader valves which are operated exclusively by the pressure in the supply line but which are controlled by the pressure in the utilization line so that while the main valve and the pilot valve are opened and kept open, the pressure in the utilization line may remain unchanged at its maximum value, thus permitting the omission of the hydraulic accumulator, if desired.

I accomplish this and other objects which will appear more clearly as the specification proceeds, by the arrangement and combination of parts and elements set forth in the following detailed description, defined in the appended claims and illustratively exemplified in the accompanying drawings, in which the single figure is a sectional view of a pressure relief valve according to the invention.

Referring now to the drawings, Fig. 1 shows a relief valve in which the casing 90 is provided with supply ports 92 and return ports 94. The main valve means include the valve seat 96, the main valve body 98 with the plunger portion 98ᵃ carrying a seal 99, and the plunger chamber 100. A short axial tubular passage 102 leads from the plunger chamber 100 to the pilot valve seat 102ᵃ. The pilot valve 112 is pressed against its seat by means of a plunger 108 loaded by a spring 110. The valve body 98 is provided with an axial bore 103 and an elongated rod 104 passes slidably through the bore 103 and with some clearance through the passage 102, and rests with its lower end on the pilot valve 112. A spiral groove 103ᵃ in the inner wall of the bore 103 provided in the valve body 98 permits the leakage of pressure fluid from the inlet port 92 past the rod 104 into the plunger chamber 100, which latter forms in this case together with the short passage 102, the pilot pressure room.

In operation, the pressure fluid passes through the groove 103ᵃ into chamber 100 and keeps the valve body 98 in closed position until the pressure exceeds the predetermined limit. When this limit has been reached the spring 110 yields, ball 112 moves downward, and the chamber 100 is exhausted, permitting the pressure in ports 92 to displace the valve body 98 into the open position. However, as long as the pressure in the inlet port 92 has not fallen below the predetermined limit, the drop of pressure in the plunger chamber 100 caused by the opening of the pilot valve 112 does not permit the latter to return to its closed position because the inlet pressure acting on the upper end of rod 104 is transmitted to the spring 110 to keep the pilot valve open.

As many changes could be made in the above construction and many widely different embodiments of this invention could be made without departing from the scope of the claims, it is intended that all matter contained in the above description or shown in the accompanying drawings shall be interpreted as illustrative and not in a limiting sense.

What I claim is:

1. A pressure regulator valve comprising a casing having an inlet port and an exhaust port with a passageway therebetween defining a valve seat, a main valve having a valve body and having a surface exposed to the pressure in said inlet port, means resiliently urging said valve body against said seat to seal said passageway, a pressure chamber in said casing longitudinally aligned with said valve body, the opposed surface of said valve body forming one wall of said pressure chamber, said pressure chamber having a discharge passageway therethrough defining a second valve seat, a ball seated on said seat, means resiliently retaining said ball in seated position, a bore through said valve body into said pressure chamber, a plunger slidably mounted in said bore and coacting with said ball valve, said plunger and the wall of said bore being conformed for flow of fluid therebetween, whereby when said valve is positioned in an inlet line with said plunger in substantially vertical position beneath said line and the pressure in said inlet line exceeds a predetermined amount, said ball valve will move off its seat for flow of fluid through said exhaust port and only when the pressure in said inlet port has fallen below said predetermined amount will said second resilient means again seat said ball valve to cut off communication between said inlet port and said exhaust port.

2. The combination recited in claim 1 in which the outer end of said plunger in said bore is exposed to the pressure of the fluid in said inlet port.

3. The combination recited in claim 1 in which said casing has a substantially cylindrical sleeve therein, said valve member is slidably mounted in one end of said sleeve, a plug in said sleeve between the inner end of said valve member and the other end of said sleeve defines the pressure chamber, said sleeve having a passageway thereinto between the plug and the other end of the sleeve providing communication from said sleeve to said exhaust port.

4. The combination recited in claim 3 in which said first resilient means comprises a coil spring compressed between the inner end of the valve member and the plug, a second plunger having a collar thereon reacts against said ball valve, an end plug seals the other end of said sleeve and said second resilient means comprises a second coil spring compressed between said end plug and said collar.

References Cited in the file of this patent

UNITED STATES PATENTS

| 534,514 | Mellin | Feb. 19, 1895 |
| 934,083 | Mills | Sept. 14, 1909 |
| 2,069,522 | Flournoy | Feb. 2, 1937 |
| 2,091,596 | Kluppel | Aug. 31, 1937 |
| 2,366,596 | Clifton | Jan. 2, 1945 |
| 2,404,102 | Schultz | July 16, 1946 |
| 2,410,751 | Schultz | Nov. 5, 1946 |
| 2,447,820 | Schultz | Aug. 24, 1948 |
| 2,479,359 | Holt | Aug. 16, 1949 |
| 2,487,575 | Mercier | Nov. 8, 1949 |
| 2,571,154 | Mercier | Oct. 16, 1951 |